United States Patent [19]
Matsuda et al.

[11] Patent Number: 5,589,077
[45] Date of Patent: Dec. 31, 1996

[54] LIQUID FILTERING AND SUPPLY SYSTEM CONTROLLING RECIRCULATION RESPONSIVE TO PRESSURE DIFFERENCE ACROSS FILTER

[75] Inventors: Yoji Matsuda, Ichihara; Masao Morikawa, Sodegaura; Masaaki Toma, Ichihara, all of Japan

[73] Assignee: Sumitomo Chemical Company, Limited, Osaka, Japan

[21] Appl. No.: 341,919

[22] Filed: Nov. 16, 1994

Related U.S. Application Data

[63] Continuation of Ser. No. 305,918, Sep. 16, 1994, abandoned.

[30] Foreign Application Priority Data

Sep. 20, 1993 [JP] Japan .................................. 5-233211
Oct. 1, 1993 [JP] Japan .................................. 5-246637

[51] Int. Cl.$^6$ .................................................. B01D 37/04
[52] U.S. Cl. ........................... 210/741; 210/90; 210/137; 210/194; 210/805; 134/902
[58] Field of Search ............................ 210/90, 130, 137, 210/194, 195.2, 196, 741, 790, 805, 808, 900; 134/2, 111, 902

[56] References Cited

U.S. PATENT DOCUMENTS

| | | | |
|---|---|---|---|
| 3,675,772 | 7/1972 | Zhukovsky et al. ...................... | 210/90 |
| 4,595,498 | 6/1986 | Cohen et al. .......................... | 210/195.2 |
| 4,929,363 | 5/1990 | Barzuza ................................. | 210/741 |
| 5,160,429 | 11/1992 | Ohmi et al. ............................. | 210/196 |
| 5,431,811 | 7/1995 | Tusuni et al. ........................... | 210/130 |

Primary Examiner—Joseph W. Drodge
Attorney, Agent, or Firm—Birch, Stewart, Kolasch & Birch, LLP

[57] ABSTRACT

A liquid filtering and supply system according to the present invention comprises, a main line to connect a liquid introducing part to a liquid supplying part, a filter disposed in said main line to filter said liquid, a first pressure detector disposed in said main line at an upstream side of said filter to detect a pressure of said liquid before said liquid is introduced to said filter, a second pressure detector disposed in said main line at a downstream side of said filter to detect a pressure of said liquid after said liquid passed out of said filter, a first circulating line for returning a liquid in said main line to the liquid introducing part, a pressure difference computing element to determine a pressure difference between the first pressure detector and said second pressure detector, a control valve disposed in the first circulating line, and a controlling part to adjust an opening of said control valve, based on a signal of the pressure difference transmitted from the pressure difference computing element.

16 Claims, 8 Drawing Sheets

Fig.5

| EXPERIMENT EXAMPLE | 1 | 2 | 3 | 4 |
|---|---|---|---|---|
| (CONDITIONS) | | | | |
| FILTER | | | | |
| STAGE NUMBER(PIECES) | 1 | 1 | 1 | 1 |
| FLOW RATE OF PASSING LIQUID (m³/hr) | 0.468 | 0.312~0.468 | 0.468~0.780 | 0.624~1.092 |
| PRESSURE DIFFERENCE (kg/cm²) | 0.28~0.3 | 0.2~0.3 | 0.3~0.5 | 0.4~0.7 |
| PRESS.DIFF. FLUCTUATION WIDTH (kg/cm²) | 0.02 | 0.1 | 0.2 | 0.3 |
| OPEN-CLOSE VALVE | | | | |
| OPENING AND CLOSING SPEED (m/sec) | 0.007 | 0.007 | 0.007 | 0.007 |
| OPERATING TIME (sec) | 1 | 1 | 1 | 1 |
| FIRST CIRCULATING LINE FLOW RATE (m³/hr) | 0.348~0.468 | 0.312 | 0.468 | 0.624 |
| FLOW RATE SUPPLIED THROUGH LIQUID SUPPLYING PART(m³/hr) | 0~0.12 | 0~0.156 | 0~0.312 | 0~0.468 |
| (RESULT) | | | | |
| PARTICLE DENSITY AFTER TREATED (NUMBER/ml) | 7.2 | 18 | 35 | 50 |
| PARTICLE CAPTURING RATE(%) | 98.0 | 94.8 | 90 | 85.7 |

Fig. 6

| EXPERIMENT EXAMPLE | 5 | 6 | 7 |
|---|---|---|---|
| (CONDITIONS) | | | |
| FILTER | | | |
| STAGE NUMBER(PIECES) | 2 | 2 | 2 |
| FLOW RATE OF PASSING LIQUID (m³/hr) | 0.468 | 0.312~0.468 | 0.468~0.780 |
| PRESSURE DIFFERENCE (kg/cm²) | 0.28~0.3 | 0.2~0.3 | 0.3~0.5 |
| PRESS.DIFF. FLUCTUATION WIDTH (kg/cm²) | 0.02 | 0.1 | 0.2 |
| OPEN-CLOSE VALVE | | | |
| OPENING AND CLOSING SPEED (m/sec) | 0.007 | 0.007 | 0.007 |
| OPERATING TIME (sec) | 1 | 1 | 1 |
| FIRST CIRCULATING LINE FLOW RATE (m³/hr) | 0.348~0.468 | 0.312 | 0.468 |
| FLOW RATE SUPPLIED THROUGH LIQUID SUPPLYING PART (m³/hr) | 0~0.12 | 0~0.156 | 0~0.312 |
| (RESULT) | | | |
| PARTICLE DENSITY AFTER TREATED (NUMBER/ml) | 4.2 | 5.4 | 7.5 |
| PARTICLE CAPTURING RATE(%) | 99.0 | 98.5 | 97.8 |

Fig. 7

| EXPERIMENT EXAMPLE | 8 | 9 | 10 |
|---|---|---|---|
| (CONDITIONS) | | | |
| FILTER | | | |
| STAGE NUMBER(PIECES) | 1 | 1 | 1 |
| FLOW RATE OF PASSING LIQUID (m³/hr) | 0.156 ~1.092 | 0.156 ~1.248 | 0.312 ~0.468 |
| PRESSURE DIFFERENCE (kg/cm²) | 0.1 ~0.7 | 0.1 ~0.8 | 0.2 ~0.3 |
| PRESS.DIFF. FLUCTUATION WIDTH (kg/cm²) | 0.6 | 0.7 | 0.1 |
| OPEN-CLOSE VALVE | | | |
| OPENING AND CLOSING SPEED (m/sec) | 0.007 | 0.007 | 0.07 |
| OPERATING TIME (sec) | 1 | 1 | 0.1 |
| FIRST CIRCULATING LINE FLOW RATE (m³/hr) | 0.156 | 0.156 | 0.312 |
| FLOW RATE SUPPLIED THROUGH LIQUID SUPPLYING PART(m³/hr) | 0 ~0.936 | 0 ~1.092 | 0 ~0.156 |
| (RESULT) | | | |
| PARTICLE DENSITY AFTER TREATED (NUMBER/ml) | 120 | 142 | 1236 |
| PARTICLE CAPTURING RATE(%) | 65.7 | 59.4 | -- |

Fig. 8

| EXPERIMENT EXAMPLE | 11 | 12 | 13 |
|---|---|---|---|
| (CONDITIONS) | | | |
| FILTER | | | |
| STAGE NUMBER(PIECES) | 1 | 1 | 1 |
| FLOW RATE OF PASSING LIQUID ($m^3$/hr) | 0.468 | 0.468 | 0.468 |
| PRESSURE DIFFERENCE ($kg/cm^2$) | 0.28~0.3 | 0.28~0.3 | 0.28~0.3 |
| PRESS.DIFF. FLUCTUATION WIDTH ($kg/cm^2$) | 0.02 | 0.02 | 0.02 |
| OPEN-CLOSE VALVE | | | |
| OPENING AND CLOSING SPEED (m/sec) | FULLY CLOSED | FULLY CLOSED | FULLY CLOSED |
| OPERATING TIME (sec) | — | — | — |
| FIRST CIRCULATING LINE | | | |
| FLOW RATE ($m^3$/hr) | 0.461 | 0.465 | 0.468 |
| FLOW RATE SUPPLIED THROUGH LIQUID SUPPLYING PART($m^3$/hr) | 0 | 0 | 0 |
| SECOND CIRCULATING LINE | | | |
| FLOW RATE ($m^3$/hr) | 0.0066 | 0.0033 | 0.0005 |
| FLOW RATE Q ($m^3$/hr) | 0.0066 | 0.0033 | 0.0005 |
| INNER SURFACE AREA S ($m^2$) | 0.55 | 0.55 | 0.55 |
| Q/S | 0.012 | 0.006 | 0.0009 |
| (RESULT) | | | |
| PARTICLE DENSITY AFTER TREATED (NUMBER/ml) | 12.1 | 17.0 | 66 |
| PARTICLE CAPTURING RATE(%) | 96.5 | 95.1 | 81.0 |

LIQUID FILTERING AND SUPPLY SYSTEM CONTROLLING RECIRCULATION RESPONSIVE TO PRESSURE DIFFERENCE ACROSS FILTER

This application is a continuation of application Ser. No. 08/305,918, filed on Sep. 16, 1994, now abandoned.

BACKGROUND OF THE INVENTION

1. Field of the Invention

The present invention relates to a liquid supply system and a liquid supply method for supplying a liquid such as organic or inorganic chemicals or the like used for semiconductor processing, and more particularly to a liquid supply system and a liquid supply method for supplying a liquid, from which particles have been removed, to the use points of semiconductor processing apparatus.

2. Related Background Art

A clean environment without any dust is required in semiconductor processing technologies for LSI, VLSI or the like. It is extremely undesirable that any particles are mixed in a cleaning liquid such as organic or inorganic chemicals for rinsing in order to clean semiconductors. Thus, usually, a cleaning liquid of chemicals and the like is subject to a filtering process with a filter after industrially produced, and then supplied for use.

However, even if such a filtering process is carried out, particles or inorganic dust generated from materials of piping or reservoirs are mixed in the liquid, while the liquid is transferred from the producing point to actual use points through the piping or while it is temporarily reserved in the reservoirs. Consequently, the density of particles in the liquid will be higher when the liquid is actually used at the use points than just after it was produced. If the liquid is used with the high density of particles, the quality of the electronic parts (e.g. semiconductors), namely products, may be deteriorated. Accordingly, another particle removing process is required just prior to the actual use of the cleaning liquid, but any systems or methods to remove particles from the liquid at high efficiency are not conventionally known, which are desired to be developed.

SUMMARY OF THE INVENTION

The present invention is to solve the aforementioned problems, and particularly it is an object of the invention to provide a liquid supply system and liquid supply method which can efficiently perform a removal of particles.

A liquid supply system according to the present invention comprises a liquid introducing part to introduce a liquid, a liquid supplying part to supply said liquid to a use point, a main line to connect said liquid introducing part to said liquid supplying part, a filter disposed in the main line to filter said liquid, a first pressure detector disposed in said main line at an upstream side of said filter to detect a pressure of the liquid before the liquid is introduced to said filter, a second pressure detector disposed in said main line at a downstream side of said filter to detect a pressure of the liquid after the liquid passed out of said filter, a first circulating line connecting a first diverging point disposed in said main line at a downstream side of said second pressure detector to said liquid introducing part to return said liquid to said liquid introducing part, a pressure difference computing element to determine a pressure difference between said first pressure detector and said second pressure detector, a control valve disposed in said first circulating line, and a controlling part to adjust an opening of said control valve, based on a signal of said pressure difference transmitted from said pressure difference computing element.

Thus, in a liquid supply system according to the present invention, the liquid introduced through the liquid introducing part passes the filter disposed in the main line where particles are removed from the liquid, and then supplied to the liquid supplying part. Pressures at the front and rear sides of the filter are detected by the first and second pressure detectors disposed at the front and rear sides respectively, and the pressure difference is determined by the pressure difference computing element. Where the determined value is at a predetermined set level, which means an adequate flow of the liquid is passing through the filter and the filter pressure difference is adequate, the opening of the control valve is not changed in the opening adjusting device, and the flow rate is kept as it is in the first circulating line. Further, where the value determined by the pressure difference computing element is over the predetermined set level, which means an excessive flow of the liquid is passing through the filter and the filter pressure difference is excessive, the control valve is throttled in the opening adjusting device based on the pressure difference signal, and the flow rate is reduced in the first circulating line. Accordingly, the pressure difference is corrected to the predetermined set level in the filter, a fluctuation of the filter pressure difference is controlled, and the particle capturing ability of the filter can always be maintained at an adequate level.

Further, a liquid supply method according to the present invention for removing particles in a liquid using a filter disposed in a main line extending from a liquid introducing part to a liquid supplying part and for supplying the liquid to a use point, comprises the steps of determining a pressure difference between a first pressure detector disposed at an upstream side of said filter and a second pressure detector disposed at a downstream side of said filter, and adjusting an opening of the control valve disposed in a first circulating line connecting a first diverging point disposed in said main line at a downstream side of said second pressure detector to said liquid introducing part, base on the pressure difference, and thus controlling the pressure difference of said filter.

The foregoing and other objects of the invention will become more apparent from a reading of the following description in connection with the accompanying drawings.

BRIEF DESCRIPTION OF THE DRAWINGS

FIG. 5 is a table showing an example of experiment with a proper pressure difference and a proper fluctuation width of pressure difference in the filter, using a first circulation line.

FIG. 6 is a table showing an example of experiment with a proper pressure difference and a proper fluctuation width of pressure difference in the filter, using a first circulation line.

FIG. 7 is a table showing an example of experiment with an improper fluctuation width of pressure difference in the filter and an improper opening and closing rate of the open-close valve, using a first circulation line.

FIG. 8 is a table showing an example of experiment with a liquid supply system of the present invention having a second circulation line and a throttling part.

DESCRIPTION OF THE PREFERRED EMBODIMENTS

Figure 1:
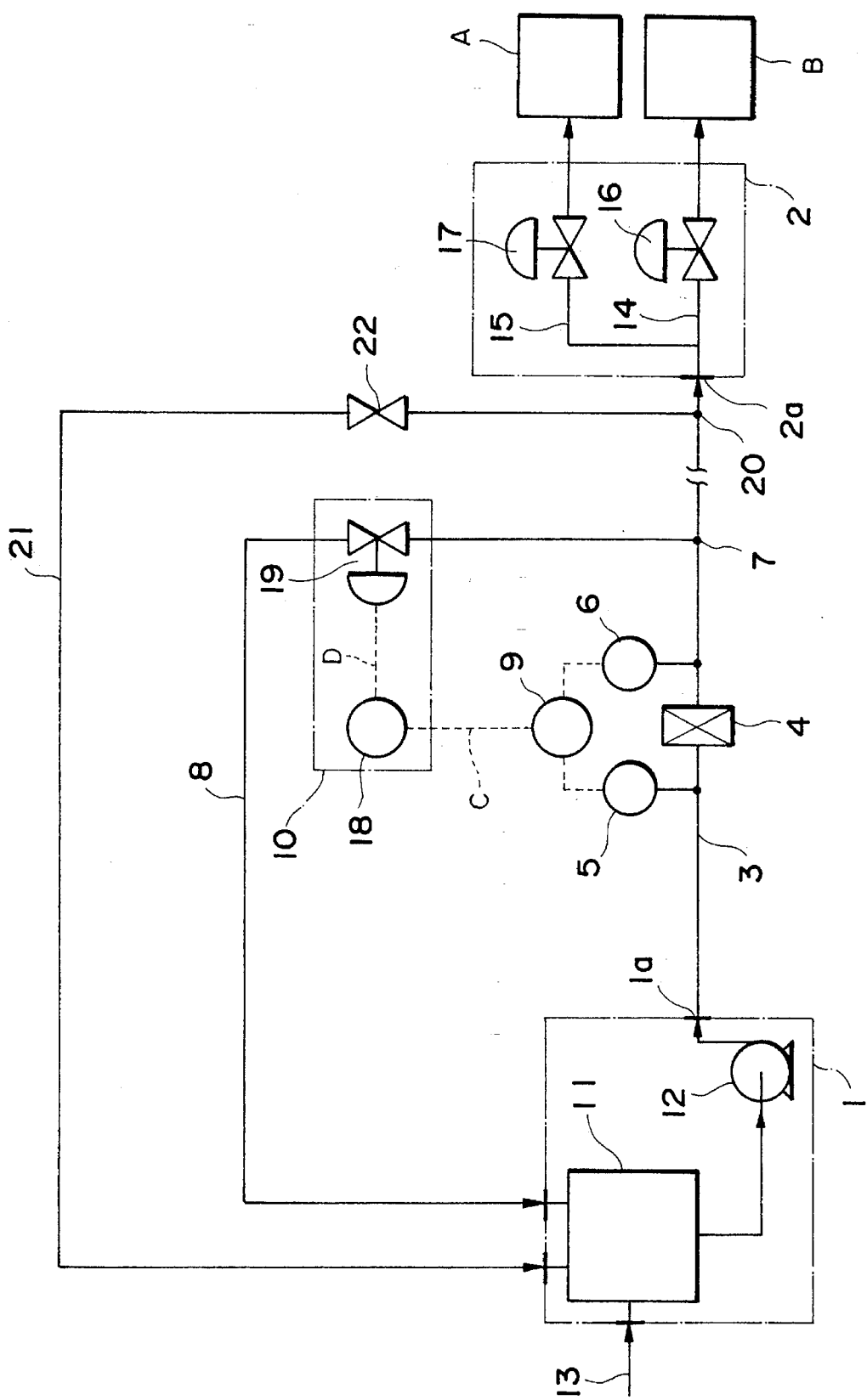
FIG. 1 is a schematic diagram illustrating an embodiment of a liquid supply system according to the present invention.

Referring to the drawings, hereinafter, preferred embodiments of liquid supply systems and liquid supply methods according to the present invention are described in detail.

Now, liquids applied to the present invention are described.

As practical examples of inorganic chemicals used for semiconductor processing, there are an aqueous solution of peroxide such as aqueous hydrogen peroxide etc., an inorganic acid such as hydrochloric acid, sulphuric acid, nitric acid, phosphoric acid, hydrofluoric acid, mixed acids, etc., an aqueous alkali solution such as aqueous ammonia etc. and an aqueous solution of inorganic salt such as ammonium fluoride etc. As practical examples of organic chemicals, there are an alcohol such as methanol, ethanol, isopropanol etc., a ketone such as acetone etc., an ester such as butyl acetate etc., an organic solvent represented by compounds containing nitrogen such as N-methyl-2-pyrolidone and the like, a solution containing novolak resin used for semiconductor photoresist, a solution containing polymer such as a solution of polysiloxane and the like used for layer insulation film, an organic alkali solution such as tetramethylammonium hydroxide and the like used for photoresist developer, and the like.

The aforementioned liquids contain particles or inorganic dust originating from the nature of the material of reserving tanks or the nature of the material of piping made of e.g. Teflon. In the descriptions hereinafter, the size of objective particles to be controlled is typically on the order of 0.1 μm or larger in diameter, and the particle content is typically several hundreds to ten thousands per one milliliter of the liquid.

Now, some of the constructions of a liquid supply system according to the present invention are described.

As shown in FIG. 1, a liquid supply system according to the present invention comprises a liquid introducing part 1 to introduce a liquid, a liquid supplying part 2 to supply the liquid to use points A, B, a main line 3 to connect the liquid introducing part 1 to the liquid supplying part 2, a filter 4 disposed in the main line 3 to filter off particles contained in the liquid flowing the main line 3, a first pressure detector 5 disposed in the main line 3 at an upstream side of the filter 4 to detect a pressure of the liquid before the liquid is introduced to the filter 4, a second pressure detector 6 disposed in the main line 3 at a downstream side of the filter 4 to detect a pressure of the liquid after the liquid passed out of the filter 4, a first circulating line 8 connecting a first diverging point 7 disposed in the main line 3 at a downstream side of the second pressure detector 6 to the liquid introducing part 1 to return the liquid to the liquid introducing part 1, a pressure difference computing element 9 to determine a pressure difference between the first pressure detector 5 and the second pressure detector 6, an opening adjusting device 10 to adjust the flow through the first circulating line 8 depending on the pressure difference signal C from the pressure difference computing element 9.

The aforementioned liquid introducing part 1 typically includes a reserving tank 11 and a liquid delivering device 12 to deliver the produced liquid to the main line 3. In the reserving tank 11, materials for liquid contacting parts such as an interior surface of the tank wall, an interior surface of the wall of the liquid introducing part or the liquid delivering part can be changed to various ones considering generation of particles in the liquid. For example, a material in a Teflon line is suitable for alkaline or acid liquids to be applied, a material in a stainless steel line for liquids in an organic solvent line, and a material in a Teflon or Pyrex glass line for solutions containing polymers. A capacity of the reserving tank 11 is properly determined considering various conditions such as a flow rate of the liquid introduced into the system and a flow rate of the circulated liquid. Further, a piping 13 through which the liquid is received directly from outside may be furnished with the reserving tank 11.

A pump such as a diaphragm type pump, a bellows type pump, a piston type pump or a centrifugal type pump is employed as the liquid delivering device 12. Instead of a pump, the liquid may be designed to be delivered into the main line 3 by pressurizing the inside of the reserving tank 11. In that event, another reserving tank may be necessary which receives liquids from the first circulating line 8 and the second circulating line 21 described hereinafter in addition to the reserving tank 11.

The aforementioned main line 3 is disposed between the outlet 1a of the liquid introducing part 1 and the inlet 2a of the liquid supplying part 2. The material of the main line 3 is properly chosen from those materials resistant to corrosion by the liquid. For example, the piping of a material in a Teflon line or Pyrex glass line is suitable for acid or alkaline liquids to be applied. The size of the main line 3 is typically 0.1–5 cm in inside diameter, but may be properly and selectively determined, based on the use or the flow rate.

The filter 4 is built in somewhere along the main line 3, and thus the entire liquid flowing in the main line 3 passes through the filter 4. Accordingly, any particles contained in the liquid delivered from the liquid introducing part 1 are properly removed by the filter 4. Here, the filter 4 is properly chosen from the ones suitable for the liquid to be used. For example, in case of a membrane filter to be used, a material in a line of Teflon such as polytetrafluoroethylene, tetrafluoroethyleneperfluoroalkylvinylether copolymer etc., a polyethylenic material such as polyethylene etc. and a polypropylenic material such as polypropylene etc. are preferable.

Each pore size of a filter 4 with a number of fine pores is typically about 0.01–0.1 μm in diameter, preferably about 0.01–0.05 μm, in case that the filter is for electronics industries and to remove particles e.g. of about 0.1 μm or larger in diameter. A filter 4 is typically about 10–150 μm in thickness, preferably about 40–100 μm, in case that the filter is for electronics industries and to remove particles e.g. of about 0.1 μm or larger in diameter. Furthermore, two or more filters 4 may be built in the main line 3 in series, which enables to remove particles more efficiently. Here, a pore size and a thickness of the filter 4 can be properly and selectively determined depending on the size of particles to be removed.

The liquid supplying part 2 is connected with a terminal point of the main line 3, and furnished with piping 14, 15 extending to outside use points A, B and open-close valves 16, 17 disposed along each of the piping 14 and 15. Preferably, the opening and closing speeds of the open-close valves 16, 17 may be low. It is because, where the valves are opened or closed very fast, the liquid flow rate may vary sharply in the main line 3 following the opening or closing of the valves, and a liquid hammering due to the valve operation propagates along the upstream and downstream lines of each of the open-close valves 16, 17. Consequently, particles sticking to the main line 3 at the downstream portion of the filter 4, particles sticking to the filter 4, particles sticking to the open-close valves 16, 17 and furthermore particles generated from the liquid contacting surfaces of the liquid contacting materials of those apparatus may flow out into the main line 3, which causes the particle density to be higher in the liquid and causes a practically improper liquid to be obtained.

Figure 2:
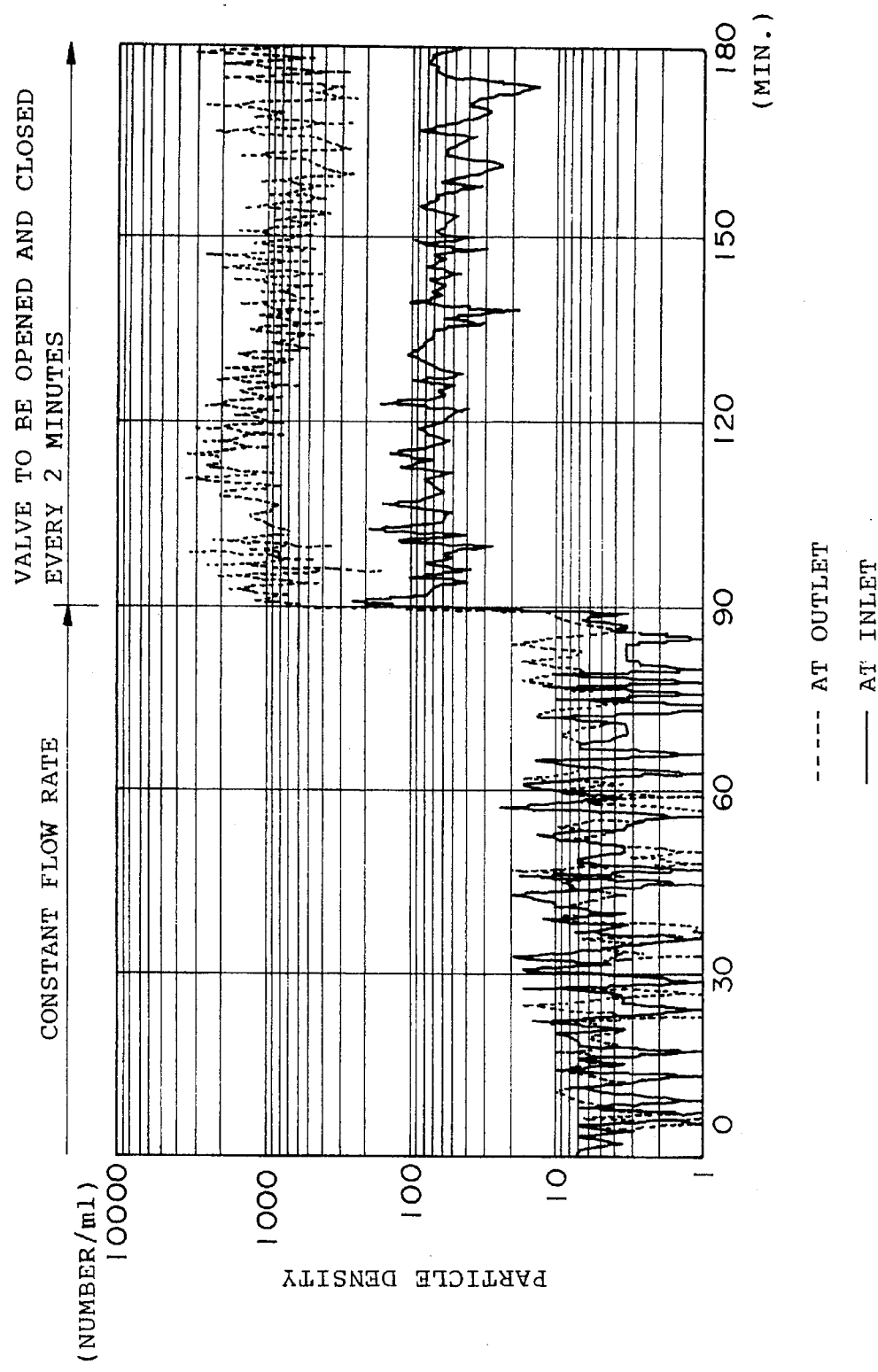
FIG. 2 is a graph showing changes in particle density occurring at an inlet and an outlet, where an opening and closing rate of the open-close valve is 0.07 m/sec and the open-close valve is opened and closed once every 2 minutes.
Figure 3:
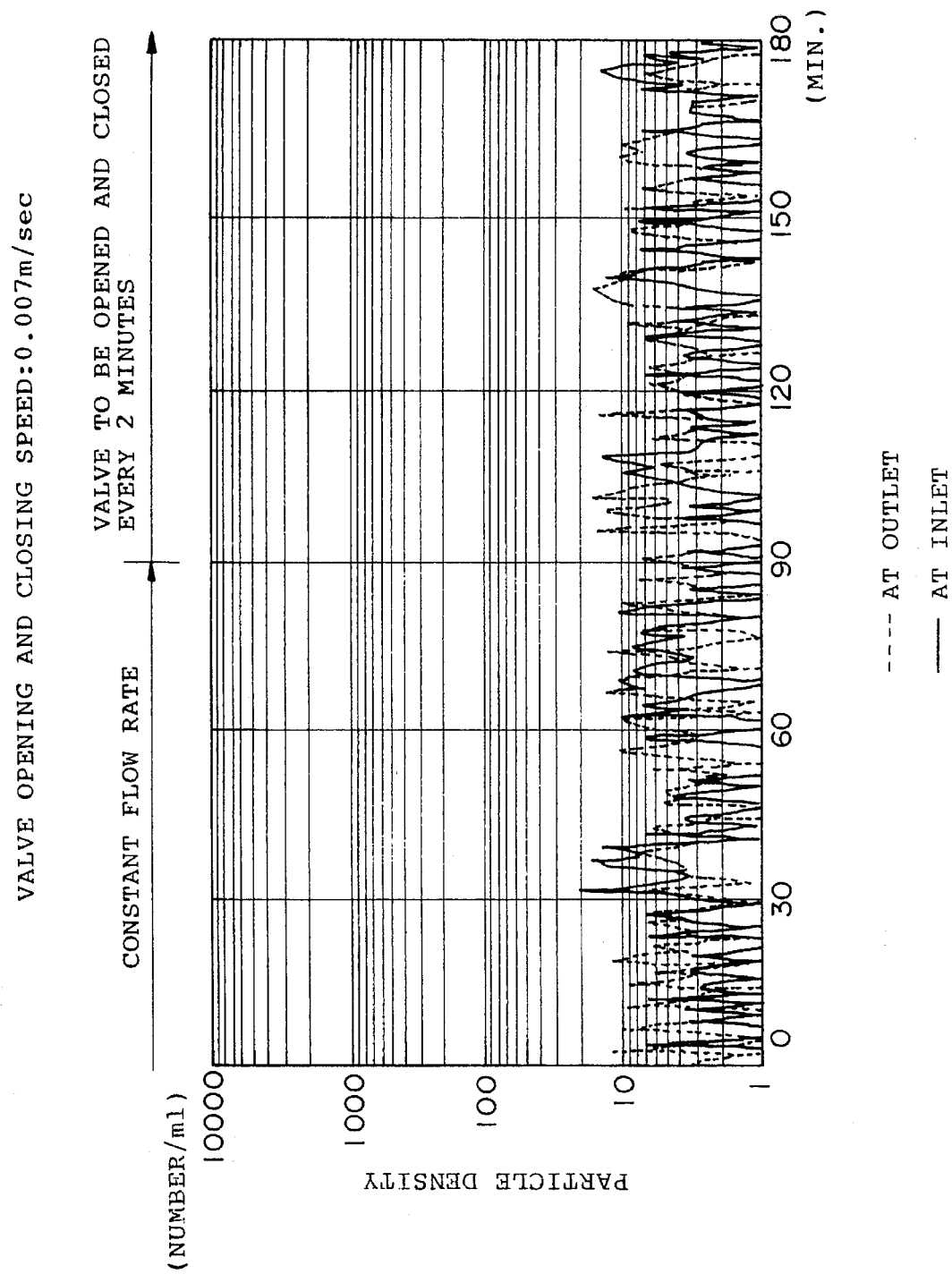
FIG. 3 is a graph showing changes in particle density occurring at an inlet and an outlet, where an opening and closing rate of the open-close valve is 0.007 m/sec and the open-close valve is opened and closed once every 2 minutes.

Various experiments have revealed that the opening and closing speeds of the open-close valves 16, 17 are preferably 0.02 m/sec or lower. For example, as shown in FIG. 2, particle density was observed to sharply increase at the inlet and outlet of the open-close valves 16, 17, where open-close valves 16, 17 having bodies of disk diaphragm type with an air cylinder driven by 5 kg/cm$^2$G air pressure were used and the valves were opened and closed every two minutes at the opening and closing speed of 0.07 m/sec (valve stem speed). In contrast, as shown in FIG. 3, particle density was observed not to vary very much at the inlet and outlet of the open-close valves 16, 17, where the valves were opened and closed every two minutes at the opening and closing speed of 0.02 m/sec or lower e.g. 0.007 m/sec. Here in FIGS. 2 and 3, the experiments were performed as the two open-close valves were disposed in parallel and the liquid was aqueous hydrogen peroxide. The valve opening and closing speed is most preferably 0.003 m/sec or lower, although its test result is not presented here.

For example, where the main line 3 is of a pipe of 1.5–2.5 cm in inner diameter, a required time to drive the valves 16, 17 from the full open position to the full closed position or vice versa may preferably be 0.5 seconds or longer, more preferably 1 second or longer, and most preferably 1.5 seconds or longer.

The aforementioned first circulating line 8 is piped to connect the first diverging point 7 to the reserving tank 11 in the liquid introducing part 1, so that some liquid is returned to the liquid introducing part 1. Its material is the same as that of the main line 3. The size of the first circulating line is properly determined but typically on the order of 0.1–5 cm in inner diameter.

Each of the first pressure detector 5 and the second pressure detector 6 includes a conventional pressure gauge such as diaphragm type pressure detector, bellows type one, Bourdon tube type one or the like. Where the first pressure detector 5 is disposed closely just before the filter 4 and the second pressure detector 6 is disposed closely just after the filter 4, the pressure difference of the filter 4 can be precisely determined. Where a plurality of filters 4 are provided in series, the opening adjusting apparatus 10 is required to adjust the flow rate of the first circulating line 8 so that the pressure difference of the filter 4 disposed at the most downstream side may be at the value described afterward.

Here, the pressure difference between the first pressure detector 5 and the second pressure detector 6 is determined by the pressure difference computing element 9. The first pressure detector 5, the second pressure detector 6 and the pressure difference computing element 9 may not be independent each other but may be integrally constructed as a pressure difference detector. A high pressure side of the pressure difference detector, for example, can be connected with an upstream side of the filter 4, and its low pressure side connected with a down stream side of the filter 4, directly with conduits, which enables to directly determine the pressure difference. In this event, a pressure difference output signal can also be obtained from the pressure difference detector, just the same as in case of the pressure difference computing element 9. The opening adjusting apparatus 10 adjusts a flow rate of the first circulating line 8 based on a pressure difference signal C transmitted from the pressure difference computing element 9. The opening adjusting apparatus 10 includes a controlling part 18 for adjusting an opening of the control valve 19 based on the pressure difference signal C from the pressure difference computing element 9, and the control valve 19 disposed along the first circulating line 8 for adjusting the flow rate of the first circulating line 8 based on a control signal D from the controlling part 18. Accordingly, a pressure difference fluctuation, caused by a variation in an opening of the open-close valves 16, 17 or a temporary shut of the open-close valves 16, 17, between before and after the filter 4 can be controlled by monitoring the pressures before and after the filter 4 with the first and the second pressure detectors 5, 6 to drive the opening adjusting apparatus 10. Here, the controlling part 18 may be integrally constructed with the pressure difference computing element 9, and further may construct a pressure difference controller integrally with the pressure difference detector additionally.

Thus, in order to keep the particle capturing ability of the filter 4 proper at all times, the aforementioned pressure difference is controlled to be at a specific adequate level between 0.01–1 kg/cm$^2$, while the opening of the control valve 19 is adjusted and the flow rate of the liquid flowing into the first circulating line 8 is adjusted. Preferably, the opening adjusting apparatus 10 is driven so that the pressure difference is controlled to be typically at 0.01–0.3 kg/cm$^2$, and the pressure difference fluctuation is controlled to be within 0.2 kg/cm$^2$, particularly within 0.1 kg/cm$^2$.

In an example of the opening adjusting apparatus 10, the controlling part 18 can be a control instrument or a computer, and the control valve 19 can be an air pressure operating automatic valve, such as a diaphragm operating automatic valve, a cylinder operating automatic valve, and a bellows operating automatic valve. Here, in the first and the second pressure detectors 5, 6, the control valve 19 etc., a liquid contacting material is properly determined, being selected from ones resistant to corrosion by the liquid.

A second diverging point 20 is located in the main line 3 at a point just before the liquid is introduced to the liquid supplying part 2, and between the second diverging point 20 and the reserving tank 11 in the liquid introducing part 1 a second circulating line 21 is disposed, which is to return a part of the liquid flowing in the main line 3 to the reserving tank 11. A throttling member 22 with a fixed opening or throttling degree is provided with the second circulating line 21. Accordingly, even where the part of the main line 3 between the first diverging point 7 and the inlet 2a of the liquid supplying part 2 is long and the open-close valves 16, 17 are closed for a long period of time, the liquid can always flow through the main line 3 on account of the flow through the second circulating line 21 with the throttling member 22 of a fixed opening or throttling degree, and consequently no particles are settled in the main line 3. Thus, even where the open-close valves 16, 17 are fully opened after those valves have been kept closed for a long period of time, the particle density does never increase in the liquid discharged from the open-close valves 16, 17. Here, needless to say, the shorter the distance between the second diverging point 20 and the inlet 2a of the liquid supplying part 2 is, the better.

The purpose of the second circulating line 21 may be achieved when the opening or throttling degree of the throttling member 22 is determined so that the ratio Q (m$^3$/hr)/S (m$^2$) is 0.001 or larger, preferably 0.01 or larger, where S is an inner surface area of the piping of the main line 3 between the outlet of the filter 4 and the second diverging point 20, and Q is a flow rate through the second circulating line 21 with the open-close valves 16, 17 closed. The inner surface area S is typically 0.1–100 m$^2$. For example, a manually operated valve such as a disk diaphragm valve, a diaphragm valve, a needle valve or the like, an orifice, a venturi tube, a capillary tube etc. may be suitable for the throttling member 22.

Next, liquid supplying methods based on the aforementioned liquid supplying systems are described below.

The predetermined amount of the liquid industrially produced is reserved in the reserving tank 11 through the piping 13, and then the liquid delivering device 12 including a pump is driven to continuously discharge the liquid at a predetermined pressure into the main line 3. The particles of 0.1 μm or larger in diameter are continuously filtered off by the filter 4.

Now, a liquid pressure before introduced to the filter 4 is detected by the first pressure detector 5 disposed at the upstream side of (preferably just closely before) the filter 4, and a liquid pressure discharged from filter 4 is detected by the second pressure detector 6 disposed at the downstream side of (preferably just closely after) the filter 4. Thereafter, a pressure difference between the pressure detected by the first pressure detector 5 and the one detected by the second pressure detector 6 is determined by the pressure difference computing element 9, and the determined value, as a pressure difference signal C, is input to the controlling part 18, the signal C is compared to a set value in the controlling part 18 and the opening of the control valve 19 is adjusted according to the control signal D. Now, where the pressure difference is at a predetermined set value, for example, 0.3 kg/cm$^2$, which means that the liquid passes through the filter 4 in an adequate flow rate and the pressure difference of the filter 4 is adequate, the control valve 19 is not moved and the opening of the control valve 19 is kept as it has been in the first circulating line 8.

Next, where the value determined by the pressure difference computing element 9 exceeds a predetermined set value, for example, 0.3 kg/cm$^2$, for example the pressure difference is 0.4 kg/cm$^2$, which means that the excessive amount of the liquid flows through the filter 4 and the pressure difference of the filter 4 is excessive, the control valve 19 is throttled by a necessary amount and the flow rate of the liquid flowing into the first circulating line 8 decreases. Where the value determined by the pressure difference computing element 9 is lower than a predetermined set value, for example, 0.3 kg/cm$^2$, for example the pressure difference is 0.2 kg/cm$^2$, which means that the less liquid than adequate passes through the filter 4 and the pressure difference of the filter 4 is too small, the control valve 19 is opened by a necessary amount and the flow rate of the liquid flowing into the first circulating line 8 increases. Consequently, the pressure difference of the filter 4 is rectified to a predetermined set value, and the pressure difference fluctuation of the filter 4 is controlled to keep the particle capturing ability proper at all times.

Here, keeping the throttling part 22 at a fixed opening or throttling degree prevents the liquid from stagnating in the main line 3. Namely, where the open-close valves 16, 17 are closed, the liquid at downstream of the first diverging point 7 in the main line 3 always flows to the second circulating line 21. Accordingly, even if the open-close valves 16, 17 are fully opened after those valves have been closed for a long period of time, the particle density of the liquid released through the open-close valves 16, 17 does not increase and the liquid of a stable quality is supplied to the use points A, B.

Further, an opening and closing speed of each of the open-close valves 16, 17, through which the liquid is supplied outside to the use points A, B, is preferably low. Particularly in the present invention, keeping the opening and closing speeds of the open-close valves 16, 17 at 0.02 m/sec or lower prevents the particles sticking to the main line 3 at downstream of the filter 4, particles settled in the filter 4 or particles sticking to the open-close valves 16, 17 from flowing out into the liquid in the main line 3, and a generation of particles from the liquid contacting surfaces of equipment materials such as the main line 3, the filter 4 and the open-close valves 16, 17, is also suppressed and no increase of the particle density of the liquid due to opening and/or closing the valves is observed.

Experiments are hereinafter described with respect to the liquid supply systems and liquid supply methods according to the present invention to prove the aforementioned figures.

The conditions, under which the experiments 1–10 shown in FIGS. 5–7 are carried out, are described hereunder.

The open-close valves 16, 17 are of a disk diaphragm valve made of a polyfluoroethylenic resin. The main line 3 has an inner diameter of 15.8 mm, the material of the inner wall surface is a polyfluoroethylenic resin, and the total length is 10 m. The filter 4 is of a pleats filter the liquid contacting surface of which is of a polyfluoroethylenic resin, its nominal pore size is 0.05 μm, its effective area is 0.6 m$^2$, and its thickness is 80 μm. The first and second pressure detectors 5, 6 are of a diaphragm type pressure detector. The material of the inner wall surface of the first circulating line 8 is a polyfluoroethylenic resin and its inner diameter is 15.8 mm. The control valve 19 is of a diaphragm driving type control valve. The liquid applied to the system is an aqueous hydrogen peroxide of 31 weight % containing particles of 0.1 μm or larger in diameter, by 350 particles per one milliliter. 2.0 m$^3$ of the aqueous hydrogen peroxide was supplied to the use points in a period of 20 hours, and the experiments were carried out at a normal temperature (about 25° C.). The amount of the particles in the liquid was measured with a SUMITOMO CHEMICAL type particle counter (HPS-100M, manufactured by Sumitomo Chemical Company, Limited).

Here, the experiment results of examples 1–10 will be inspected, where the experiments were carried out under the aforementioned conditions and the pressure difference, the width of pressure difference fluctuation, the opening and closing speed of the open/close valves etc. were varied.

In the experiment examples 1–3 and 5–7, the pressure difference is within the range of 0.01–1 kg/cm$^2$, the width of pressure difference fluctuation is not larger than 0.2 kg/cm$^2$, and the opening and closing speed of the open-close valves is not higher than 0.02 m/sec (0.007 m/sec here). Accordingly, it was proven that very high particle capturing rate was attained by the filter 4. In the example 4, the width of pressure difference fluctuation was 0.3 kg/cm$^2$, slightly exceeding 0.2 kg/cm$^2$. Although the particle capturing rate tends to decrease a little, as 85.7%, the level is apparently acceptable in practice.

In contrast, in the experiment examples 8, 9, the pressure difference fluctuation width considerably exceeds 0.2 kg/cm², to 0.6 and 0.7 kg/cm² respectively, which means the particle capturing rate is not suitable for practical use. In the example 10, although the pressure difference fluctuation width is smaller than 0.2 kg/cm², the opening and closing speeds of the open-close valves are 0.07 m/sec, namely higher than 0.02 m/sec, and the valves are opened and closed very quickly. The result shows that, consequently the liquid flow rate varies sharply in the main line, and a liquid hammering due to the valve movement propagates to an upstream line and a downstream line of the open-close valves, which causes the particles sticking to the main line 3, filter 4, the open-close valves 16, 17, etc. and the particles generated from the liquid contacting surfaces of those equipment materials to flow out into the liquid, and the particle density in the liquid to increase.

Next, a case where the second circulating line 21 and the throttling part 22 are provided with the liquid supply system of the present invention is described.

The conditions, under which the experiments 11–13 shown in FIG. 8 are carried out, are described hereunder.

The second circulating line 21 has an inner diameter of 15.8 mm, the material of the inner wall surface is a polyfluoroethylenic resin, and the total length is 10 m. A disk diaphragm valve is used as the throttling part 22. Now, the other conditions are the same as those of the aforementioned experiment examples 1–10, but the open-close valves were closed.

It is figured out that a very high particle capturing rate is attained, while the ratio Q (m³/hr)/S (m²) is 0.001 or larger, where S is an inner surface area of the piping of the main line 3 between the outlet of the filter 4 and the second diverging point 20, and Q is a flow rate through the second circulating line 21, in the experiment examples 11 and 12. In the experiment example 13, the ratio Q (m³/hr)/S (m²) is 0.0009 and the particle capturing rate, 81.0%, tends to decrease a little, which seems to be at the level of practically no problem.

Figure 4:
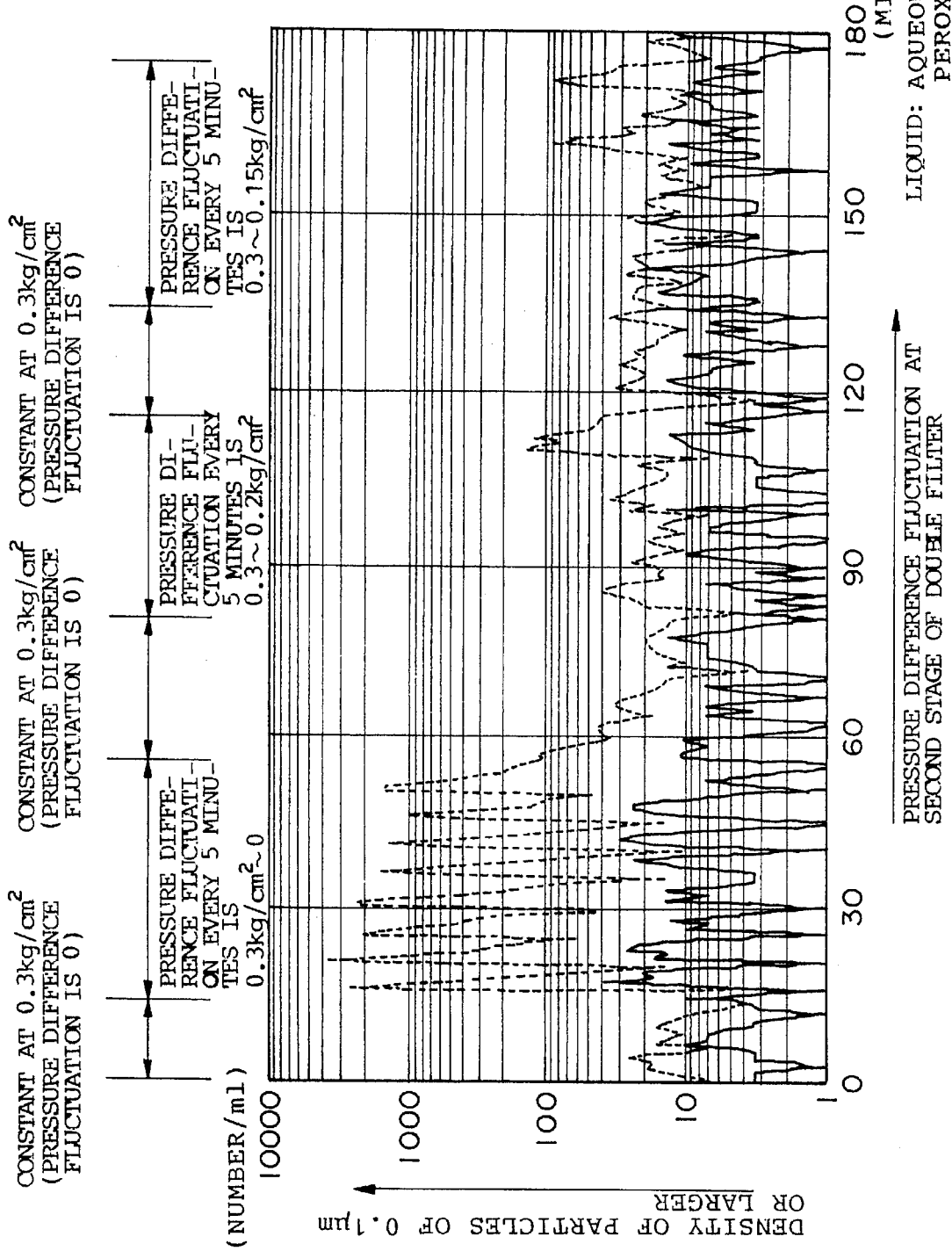
FIG. 4 is a graph showing what happens where a pressure difference of the second stage filter of the two stage filter is varied within a proper-looking range.

FIG. 4 shows what happens when the pressure difference is varied in an apparently proper range with a double type filter. As understood from FIG. 4, where the width of the pressure difference fluctuation is in a range of 0.3–0 kg/cm², relatively large width, the number of particles discharged from the first stage filter is large, which increases the amount of particles at the inlet of the second stage filter. It means that the second stage filter incurs a heavier burden to capture particles than the first stage filter does. In contrast, where the width of the pressure difference fluctuation is in a range of 0.3–0.2 kg/cm², and 0.3–0.15 kg/cm² relatively small width, more particles are captured by the first stage filter, which means that the second stage filter incurs a less burden to capture particles than before. As the liquid supply system and liquid supply method according to the present invention are constituted as described above, the following advantages are obtained. Namely, as the pressure difference of the filter is controlled while the pressure difference between the first pressure detector disposed at the upstream side of the filter and the second pressure detector disposed at the downstream side of the filter is determined, and based on the pressure difference the flow rate through the first circulating line is adjusted, where the first circulating line connects the first diverging point located at the downstream side of the second detector in the main line to the liquid introducing part, particles are efficiently removed by the filter, particularly particles of 0.1 µm or larger in size are efficiently removed, and thus the liquid from which particles are removed by the filter can be widely utilized in electronics industries.

While the present invention has been described in detail by specific reference to preferred embodiments, it is understood that variations and modifications thereof may be made without departing from the true spirit and scope of the invention.

What is claimed is:

1. A liquid supply system comprising:

a liquid introducing part to introduce a liquid;

a liquid supplying part to supply said liquid to a use point;

a main line having ends connecting with said liquid introducing part and said liquid supplying part;

a filter disposed in said main line to filter said liquid;

a first pressure detector disposed in said main line at an upstream side of said filter to detect a pressure of said liquid before said liquid is introduced to said filter;

a second pressure detector disposed in said main line at a downstream side of said filter to detect a pressure of said liquid after said liquid has passed out of said filter;

a first circulating line connecting a first diverging point disposed in said main line at a downstream side of said second pressure detector to said liquid introducing part to return said liquid to said liquid introducing part;

a pressure difference computing element to determine a pressure difference between said first pressure detector and said second pressure detector;

a control valve disposed in said first circulating line; and a controlling part operable to adjust an opening of said control valve, based on a signal of said pressure difference, said signal being transmitted from said pressure difference computing element.

2. A liquid supply system as recited in claim 1, further comprising:

a second circulating line extending from a second diverging point disposed in said main line, just upstream of said liquid supplying part, to said liquid introducing part; and a throttling member disposed in said second circulating line, with a constant opening or throttling degree.

3. A liquid supply system as recited in claim 2, wherein said opening or throttling degree of said throttling member can provide a Q/S value of at least 0.001, wherein Q(m³/hr) is a flow rate through said second circulating line with said open-close valve closed, and S(m²) is an inner surface area of said main line between an outlet of said filter and said second diverging point.

4. A liquid supply system as recited in claim 1, further comprising an open-close valve system in a liquid supplying line of said liquid supplying part, wherein the open-close valve system has a maximum opening speed and a maximum closing speed of 0.02 m/sec or lower.

5. A liquid supply method for removing particles in a liquid using a filter disposed in a main line having ends connecting with a liquid introducing part and a liquid supplying part and for supplying said liquid to a use point, comprising the steps of:

determining a pressure difference between a first pressure detector disposed at an upstream side of said filter, in said main line, and a second pressure detector disposed at a downstream side of said filter, in said main line; and adjusting a flow rate through a first circulating line connecting a first diverging point disposed in said main line at a downstream side of said second pressure detector to said liquid introducing part, based on said pressure difference, and thus controlling said pressure difference.

6. A liquid supply method as recited in claim 5, further comprising the steps of:

providing a second circulating line extending from a second diverging point disposed in said main line, just upstream of said liquid supplying part, to said liquid introducing part; and providing a throttling member disposed in said second circulating line, with a constant opening or throttling degree.

7. A liquid supply method as recited in claim 6, further comprising the step of setting the opening or throttling degree of said throttling part so that a value of Q/S of at least 0.001 is achieved, where Q ($m^3$/hr) is a flow rate through said second circulating line with said open-close valve closed, and S ($m^2$) is an inner surface area of said main line between an outlet of said filter and said second diverging point.

8. A liquid supply method as recited in claim 5, further comprising the step of providing an open-close valve in a liquid supplying line of said liquid supplying part; and opening and closing said open-close valve at speeds of 0.02 m/sec or lower.

9. A liquid supply system comprising:

a liquid introducing part to introduce a liquid, said liquid introducing part including a liquid delivering device, said liquid delivering device having a lower pressure side through which the liquid is provided for said liquid delivering device, said liquid delivering device having a higher pressure side through which the liquid is delivered from said liquid delivering device;

a liquid supplying part to supply said liquid to a use point;

a main line having ends connecting with said liquid introducing part and said liquid supplying part, said main line connected with said higher pressure side of said liquid delivering device;

a filter disposed in said main line to filter said liquid;

a first pressure detector disposed in said main line at an upstream side of said filter to detect a pressure of said liquid before said liquid is introduced to said filter;

a second pressure detector disposed in said main line at a downstream side of said filter to detect a pressure of said liquid after said liquid passes out of said filter;

a first circulating line connecting a first diverging point disposed in said main line at a downstream side of said second pressure detector to said lower pressure side of said liquid delivering device to return said liquid to said liquid introducing part;

a pressure difference computing element to determine a pressure difference between said first pressure detector and said second pressure detector;

a control valve disposed in said first circulating line; and a controlling part operable to adjust an opening of said control valve, based on a signal of said pressure difference, said signal being transmitted from said pressure difference computing element.

10. A liquid supply system as recited in claim 9, further comprising:

a second circulating line extending from a second diverging point disposed in said main line, just upstream of said liquid supplying part, to said liquid introducing part; and a throttling member disposed in said second circulating line, with a constant opening or throttling degree.

11. A liquid supply system as recited in claim 10, wherein said opening or throttling degree of said throttling member can provide a Q/S value of at least 0.001, wherein Q ($m^3$/hr) is a flow rate through said second circulating line with said open-close valve closed, and S ($m^2$) is an inner surface area of said main line between an outlet of said filter and said second diverging point.

12. A liquid supply system as recited in claim 9, further comprising an open-close valve system in a liquid supplying line of said liquid supplying part, wherein the open-close valve system has a maximum opening speed and a maximum closing speed of 0.02 m/sec or lower.

13. A liquid supply method for removing particles in a liquid using a filter disposed in a main line having ends connecting with liquid introducing part and a liquid supplying part and for supplying said liquid to a use point, comprising the steps of:

pressurizing the liquid from a lower pressure side to a higher pressure side across said liquid introducing part;

delivering the liquid to said main line;

determining a pressure difference between a first pressure detector disposed at an upstream side of said filter, in said main line, and a second pressure detector disposed at a downstream side of said filter, in said main line; and adjusting a flow rate through a first circulating line connecting a first diverging point disposed in said main line at a downstream side of said second pressure detector to said lower pressure side, based on said pressure difference, and thus controlling said pressure difference.

14. A liquid supply method as recited in claim 13, further comprising the steps of:

providing a second circulating line extending from a second diverging point disposed in said main line, just upstream of said liquid supplying part, to said liquid introducing part; and providing a throttling member disposed in said second circulating line, with a constant opening or throttling degree.

15. A liquid supply method as recited in claim 14, further comprising the step of setting the opening or throttling degree of said throttling part so that a value of Q/S of at least 0.001 is achieved, where Q ($m^3$/hr) is a flow rate through said second circulating line with said open-close valve closed, and S ($m^2$) is an inner surface area of said main line between an outlet of said filter and said second diverging point.

16. A liquid supply method as recited in claim 13, further comprising the step of providing an open-close valve in a liquid supplying line of said liquid supplying part; and opening and closing said open-close valve at speeds of 0.02 m/sec or lower.

* * * * *